Feb. 17, 1970   H. R. NEWELL   3,496,395
STRAIN WAVE GEARING SYSTEMS WITH DISTRIBUTED DISCONTINUITIES
Filed May 9, 1968
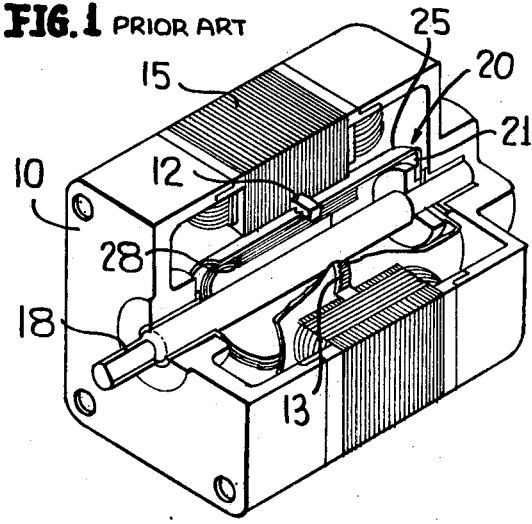
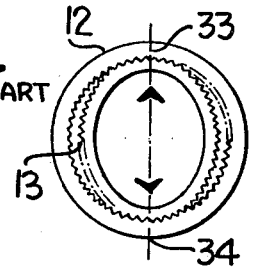
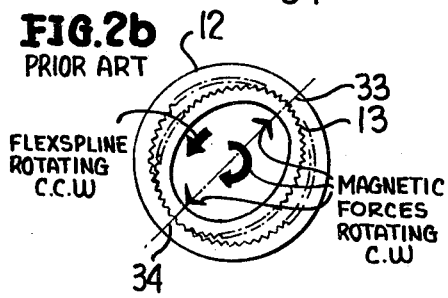
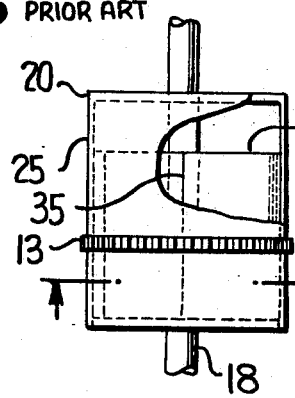
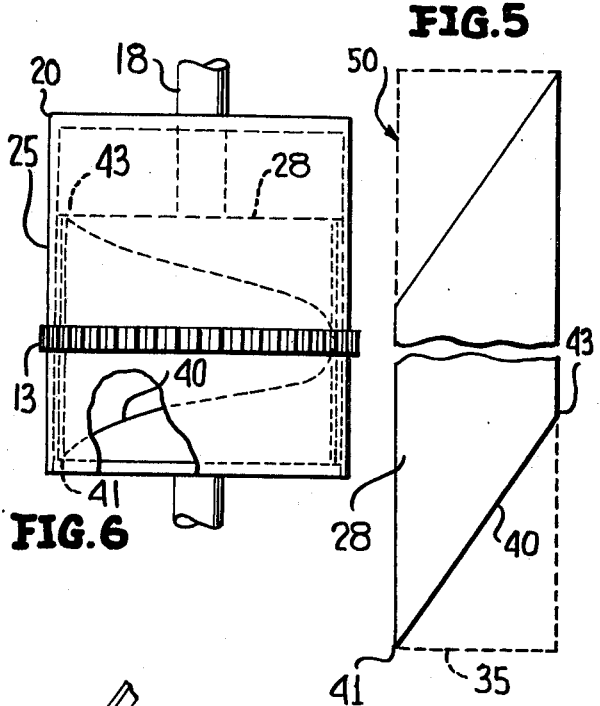
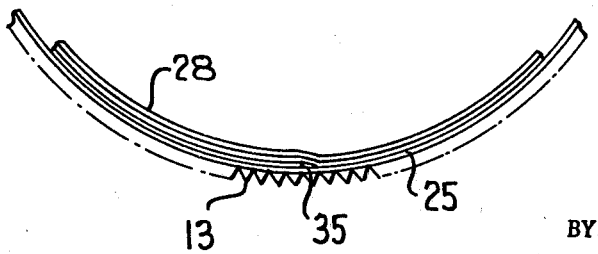
INVENTOR
HAROLD R. NEWELL
BY Horwitz, Rau & Greene
ATTORNEYS

United States Patent Office 3,496,395
Patented Feb. 17, 1970

3,496,395
STRAIN WAVE GEARING SYSTEMS WITH
DISTRIBUTED DISCONTINUITIES
Harold R. Newell, South Newbury, N.H., assignor to
Mesur-Matic Electronics Corporation, Warner, N.H.,
a corporation of Delaware
Filed May 9, 1968, Ser. No. 727,837
Int. Cl. H02k 7/10
U.S. Cl. 310—82                                    9 Claims

ABSTRACT OF THE DISCLOSURE

A gearing system has a rigid circular spline that encompasses a flexible annular spline of smaller diameter and common axis. A thin magnetically permeable strip is wound in layers within the flexible spline and has an end region of continuously varying width disposed immediately adjacent the curved inner surface of the flexible spline, the strip tending to distort the flexible spline into mesh with the rigid spline along a portion of the periphery of the flexible spline, under the influence of a rotating magnetic field.

Background of the invention

The present invention relates generally to strain wave gearing, wherein areas of mating relationship or engagement between the teeth on opposing cylindrical surfaces of two circular ring gears are peripherally propagated in the form of a wave deflection, or strain wave, in one of the gears.

The principles of strain wave gearing, or harmonic drive as it is sometimes called, are set forth in some detail in United States Patent 2,906,143, issued Sept. 29, 1959 to Musser, and need not be greatly elaborated upon here. In brief, the basic principles are embodied in a motion transmitting device, wherein is provided a circular ring gear (referred to as a circular spline) having teeth on its interior perimeter, a flexible substantially circular ring gear (referred to as a flexspline) of different diameter from but coaxial with the circular spline and having teeth on its periphery, and a strain inducing device by which the flexspline is driven and simultaneously deflected to force its teeth into meshing relationship with the circular spline at a plurality of circumferentially spaced points separated by areas of non-contacting relationship, on the flexspline. Accordingly, as the flexspline is rotationally driven by the strain inducer a strain wave is propagated about the periphery of the flexspline, and is accompanied by relative rotation of the two gears in the event of a tooth differential thereon.

The circular spline is an annular ring provided with inwardly directed teeth, that is, teeth projecting radially along the inner perimeter or interior cylindrical surface thereof. The flexspline, which is occasionally termed a strain gear, is also annular, and is fabricated of a thin resilient material capable of elastic deflection, and provided with external teeth projecting radially about and from the periphery thereof. The numbers of teeth and the pitch diameters of the two gears differ, the flexspline having fewer teeth than the circular spline by an amount equal to or a multiple of the number of positions of mating engagement between the gears, these areas of mating engagement occurring as previously noted, when the flexspline is driven with predetermined distortion by the strain inducer.

The strain inducing device may take on a variety of forms. For example, as disclosed in the aforementioned Musser patent, the strain inducer is mounted on a shaft that shares a common axis with the circular spline and the flexible spline, and possesses a configuration adapted to exert forces on the inner periphery of the flexspline, when in appropriate position within the latter, to deflect or distort the thin resilient wall of the flexspline and thereby produce the desired mating relationship between the two gears at a plurality of circumferentially spaced positions. As the strain inducer drives the flexspline, the teeth of the two gears experience complete meshing (i.e., undergo full splined tooth engagement) at only a limited portion, being completely separated from one another (i.e., undergo full tooth disengagement) in areas approximately midway between the positions of complete mating engagement in those instances where sufficient disparity exists between pitch diameters (and tooth differential) of the gears. Accordingly, a strain wave is propagated about the periphery of the flexspline, one complete revolution of which is characterized by a tooth movement equal to the tooth differential between the gears such that the gears undergo relative rotation. The gear having the largest number of teeth per radian moves in the same direction as the strain inducer when the latter is driving the flexspline.

In a commercially available form, a synchronous actuator embodying the principles of strain wave gearing or harmonic drive, utilizes an electromagnetic strain inducer or wave generator. In particular, the wave generation is accomplished magnetically by a rotating magnetic field. When equipped as a stepping motor or stepping device, for example, the actuator has a stator assembly with six or more salient poles that are sequentialy energized in diametrically opposite pairs, to provide high resolution and response. Produced as a synchronous motor, the actuator utilizes a conventional rotating field in which it is operated by a two-phase (split-phase) or three-phase current, to render it capable of driving large, directly coupled loads into synchronization. In the commercial stepping motor model, for example, the flexspline is pulled into mesh with the circular spline at diametrically opposite positions of the splines or gears in response to energization of diametrically opposite pairs of stator poles. Rotation of the magnetic forces in accordance with sequential energization of the stator pole pairs is accompanied by a corresponding rotation in the mesh of the splines. As the magnetic field makes one complete rotation, the flexspline rotates that portion of a complete rotation equal to the difference between the number of teeth on the flexspline and the number of teeth on the circular spline, divided by the number of teeth on the flexspline. In other words, the rotation of the flexspline is a function of the difference in the number of teeth between the two gears, and the direction of rotation or sense of rotation depends upon which of the gears has the largest number of teeth per radian. Effective inertia of the stepping motor actuator is very low because the flexible spline is the only rapidly moving element or component of the actuator during operation (in accordance, of course, with the rotating magnetic field).

In general, in the commercially available models of the synchronous actuator, the flexible spline is carried by a cup which includes a tube concentric with the output shaft of the device and having one of its ends closed and attached to the shaft. In this manner, as the flexspline rotates it drives the output shaft of the actuator. Typically, the flexible spline gear is cut on the outside of the tube along a circular strip thereon which may be located at any point along the length of the cup, depending on location of the circular spline. In one model, for example, the flexible spline is positioned about half way along the tube, while in another model the spline is located at the open end of the cup.

In all commercially available models of the synchronous actuator of which I am aware, the cup that carries the flexible spline is of extremely thin walled construction, being machined from magnetic stainless steel to permit distortion of the tube, and thus of the flexspline itself, by the magnetic field such that the flexspline and the circular spline (which is attached to the motor frame or to another portion of the rigid structure) are in mesh at separated positions along the periphery of the flexspline. To enhance the magnetic properties of the rotatable flexible tube that carries the flexspline, several layers of silicon steel strip of a thickness generally in the range from 0.001″ to 0.013″ are wound within the tube adjacent its interior surface. It has been observed that the synchronous actuator utilized as a stepping device possesses an inaccuracy of stepped position approximating an error of ±10% (or more) of a step. I have found that this error is principally the result of the mechanical discontinuity of the magnetic material (i.e., the silicon steel strip wound inside the flexible tube) that occurs at the beginning of the strip winding, and of the magnetic discontinuity that occurs when this mechanical discontinuity cyclically rotates through the magnetic field. In particular, the magnetically permeable strip is cut along a line perpendicular to its length, and this square cut end is bonded or otherwise attached or positioned against or adjacent the inner surface of the tube carrying the flexible spline. As the strip is wound in layers about the interior of the tube, the succeeding layers are displaced at the point occupied by the square end by an amount equal to the thickness of the strip itself, this abrupt variation in material and the gap producing the mechanical discontinuity and magnetic discontinuity referred to above. In consequence of this configuration, the discontinuity is parallel to the gaps in the stator pole faces; and as the flexible tube rotates, the discontinuity moves cyclically through the magnetic gaps, causing an unbalance in the magnetic field and hence, in the force distorting the flexible cylinder. The uneven distortion creates the aforementioned error in stepped position of the shaft. Since the flexible cylinder itself rotates as a result of the tooth differential between the flexible spline and the circular spline, this error is compounded, occurring on a cyclical basis with the crossing of the position of discontinuity past each stator gap several times during a complete rotation of the cylinder.

Accordingly, it is a principal object of the present invention to improve the accuracy of synchronous actuators of the type discussed above.

It is a more specific object of the present invention to substantially reduce inaccuracies occurring as a result of discontinuity in the magnetic circuit and component configuration of a strain wave gearing system employing electromagnetic wave generation.

Summary of the invention

Briefly, in accordance with the present invention, the end of the magnetically permeable strip or tape which is to be attached to the interior surface of the flexible tube is cut such that the strip width increases gradually from a dimension of or approaching zero width, to the full normal dimension, preferably over a strip length approximately equal to the inner circumference of the flexible cylinder.

In its simplest form, the invention achieves this objective by the provision of an angular cut in the end of the strip, that is, a straight-line diagonal slicing of the strip end, such that the cut end is distributed longitudinally over a predetermined length of the strip. In other words, the terminations of the cut from an extremity of the strip of reduced width to the full width of the strip are separated from one another by a length approximately equal to the interior circumference of the flexible tube which carries the flexible spline. Accordingly, the mechanical and magnetic discontinuity is distributed over an entire 360°, i.e., throughout the extent of the stator gaps, and therefore does not affect the accuracy of stepped position by any appreciable amount. As a result, there is a substantial improvement in the accuracy of the motor, over the prior art motor configurations of the strain wave gearing type.

Brief description of the drawings

The above and still further objects, features and attendant advantages of the present invention will become apparent from a consideration of the following detailed description of a preferred embodiment thereof, especially when taken in conjunction with the accompanying drawings, in which:

FIGURE 1 is a cutaway view, in perspective, of a typical motor or actuator embodying the principles of strain wave gearing, to which the present invention is applicable;

FIGURES 2(a) and 2(b) are mechanical schematic diagrams, respectively illustrating areas of mating engagement of the two splines, and rotation of those areas as a result of the rotating magnetic field;

FIGURE 3 is a partially broken-away side view of a portion of the flexible cup, spline and shaft assembly of the motor of FIGURE 1;

FIGURE 4 is a partial sectional view of the assembly of FIGURE 3, taken along the lines 4—4 thereof;

FIGURE 5 is a plan view of the magnetically permeable strip, to be attached to the interior surface of the flexible cup shown in FIGURES 1, 3 and 4, illustrating a preferred form of strip cut contemplated by the present invention as compared with the cut end as taught by and practiced in the prior art; and FIGURE 6 is a partially broken-away side view of a cup assembly similar to that shown in FIGURE 3, utilizing the magnetically permeable strip arrangement of FIGURE 5.

Description of a preferred embodiment

Referring now to FIGURE 1, a synchronous actuator or motor of a type to which the principles of the present invention are applicable is a strain wave gearing system including a housing 10, a pair of gears 12 and 13, a strain inducer or wave generator generally designated by reference number 15, and an output shaft 18 to be coupled to a load. The three basic elements of the strain wave gearing mechanism are gears 12 and 13 and wave generator 15.

As previously discussed and as shown in detail in the assembly of FIGURE 1, wave generator 15 is an electromagnetic field generator in the form of a stator assembly with poles and windings. Also as previously discussed, one of the gears, 12 in this case, is a rigid circular spline attached to the motor housing or to another portion of the rigid structure, here shown as integral with the stator; while the other gear, 13, is the flexible spline which is carried by a flexible cup 20 whose base or closed end 21 is attached to output shaft 18. The arrangement thus far shown and described with reference to FIGURE 1 is completely conventional, and motors of this type are commercially available from the United Shoe Machinery Corporation, Harmonic Drive Division, Beverly, Mass. under the trade name Responsyn Actuators, HDUM Series.

To insure that the rotatable flexible tube portion 25 of cup 20 possesses the desired magnetic properties which will result in high response to the rotating magnetic field, it is also conventional to cover the interior surface of tube 25, in the region adjacent the stator poles, with several layers of magnetically permeable strip material, such as silicon steel strip or tape having a thickness in the range from 0.001 inch to 0.013 inch, the wound strip generally designated by reference number 28 in FIGURE 1.

As shown in the mechanical schematic diagram of FIGURE 2(a), the flexible spline 13 is pulled into mesh with circular spline 12 at diametrically opposite positions of the spline, in response to energization of diametrically opposite pairs of poles in the stator assembly. The splines are in full tooth engagement in the areas designated by reference numbers 33 and 34 and are in full tooth disengagement in regions between the areas of complete mesh. As a rotating magnetic field is applied in accordance with appropriate energization of the stator windings, these areas of mesh, i.e., 33 and 34, rotate in the direction of field rotation, as shown in FIGURE 2(b). Flexible spline 13 rotates at a much slower rate, as previously explained, in a direction or sense corresponding to or counter to the direction of rotation of magnetic field depending upon relative numbers of teeth on the two gears. Since the flexible spline 13 generally will have fewer teeth than the circular spline, being encompassed thereby and of smaller diameter than the latter, its rotation is in a direction opposite that of the rotating magnetic field. Thus, if the magnetic forces rotate in a clockwise (CW) direction as shown in FIGURE 2(b), the flexspline rotates in a counterclockwise (CCW) direction.

Referring now to FIGURES 3 and 4, the former a simplified side view of the cup, flexible spline and output shaft assembly of the motor of FIGURE 1, it will be observed that the flexible spline is generally positioned in a narrow region along the length of tube 25, the specific position depending upon the position at which the circular spline 12 is located and upon certain other factors which are irrelevant to the present invention. In any event, it will be noted that the permeable magnetic strip 28 which is wound in several layers within flexible tube 25 has an end 35 which is cut in a direction perpendicular to the nominal longitudinal direction of the strip itself. Thus, the attachment or placement of the end 35 of strip 28 against or adjacent the interior surface of tube 25 is along a line parallel to the axis of the tube (and the axis of the shaft, of course). Accordingly, a mechanical discontinuity occurs at the beginning of the strip winding, owing to the square cut end 35 of strip 28, as shown more clearly in the fragmentary sectional view of FIGURE 4. Each succeeding layer of the strip is displaced by a thickness of the strip at the point of the strip's origin, that is, along the line occupied by strip end 35, so that a magnetic discontinuity exists in addition to the mechanical discontinuity.

It will be observed from the general arrangement of components as shown in FIGURE 1 that the mechanical discontinuity is parallel to the stator pole gaps, and that as the flexible tube 25 rotates under the influence of the rotating magnetic field, the discontinuity is cyclically moved past the magnetic gaps. In so doing, this discontinuity creates an unbalance in the magnetic field that is normally acting to distort flexible cylinder 25, and the flexspline 13 carried thereby, to produce the mating relationship or engagement between the splines as shown in FIGURES 2a and 2b. The disruption of mechanical symmetry owing to the mechanical discontinuity, and the unbalance of the magnetic field owing to the magnetic discontinuity act in concert to produce an uneven distortion and rotation of tube 25 and flexspline 13, resulting in the aforementioned inaccuracy of the stepped position of output shaft 18. Errors of ±10% or more of a step have been observed in operation of the motor. The relative rotation of cylinder 25 which occurs as the result of tooth differential between circular spline 12 and flexible spline 13 aggravates the problem because the strip end discontinuity crosses each stator gap several times during a single complete rotation of the cylinder.

This error in stepping position is sharply reduced, if not completely eliminated, by gradually increasing the strip width from a small value at the end attached or adjacent to the interior surface of the tube, until the entire normal width of the strip is reached at a point spaced from the extreme end of the strip by a distance approximately equal to the interior circumference of the tube.

While the strip need not be cut along a straight line, that is a particularly simple manner by which an end region of the strip with continuously varying width may be obtained. A strip cut in this manner is shown in FIGURE 5, and is compared with the strip end subjected to a square cut (shown in dotted line) as taught by the prior art. Referring to FIGURE 5, the end 35 of strip 28 is cut along a straight line 40 at an angle to one edge such that point 41 at the extreme end or tip is separated from point 43, at which the normal strip width begins, by a distance approximately equal to the interior circumference of tube 25. Hence, when the strip is fastened to the interior surface of tube 25 with point 41 located at a position corresponding to that formerly occupied by a portion of the square cut end 35, and the strip is wound about the interior surface of the tube in successive layers, as before, that portion of the strip along which the angled cut occurs forms a spiral on the inner surface of the tube, as shown in FIGURE 6.

If the distance separating the terminations of the cut, that is points 41 and 43, is precisely equal to the internal circumference of the tube, then points 41 and 43 are located directly opposite one another at either side of the strip when the first layer of the strip has been wound about the surface of the tube. This dimension is not critical but does serve to provide the greatest distribution of the discontinuity, over an entire 360° of the stator, without sacrificing the magnetic properties, which are, after all, the basic purpose of the permeable magnetic strip. Since the discontinuity is not abruptly encountered in motor or actuator embodiments according to the present invention, but rather is distributed gradually over the entire region occupied by the stator assembly, and further, since a more symmetrical mechanical configuration is obtained, there is no appreciable effect of the discontinuity on the stepped position of the motor output shaft.

Although the other end of the strip 28 is less critical a factor in motor operation, particularly if it is separated by several layers of the wound strip from the internal surface of tube 25, it may nevertheless also be cut to provide a continuously increasing width in the manner described above. In that event, it is preferable that the cuts in each end approximately parallel one another (see e.g., reference number 50 in FIGURE 5) and that the strip be sufficiently long that the region above the vacancy left by the missing portion of the strip end adjacent the tube surface be "occupied" (several layers away from the vacancy) by the remaining portion of the strip end remote from the tube surface. This establishes a more symmetrical arrangement. To this end, the strip length should be a multiple of the inner circumference of the tube.

I claim:
1. A gearing system comprising
   a rigid annular gear having teeth projecting from the interior cylindrical surface thereof,
   a thin flexible annular gear of smaller diameter than said rigid gear having teeth projecting from the outer periphery thereof,
   a flexible tube supporting said flexible gear at a position within and coaxial with said rigid gear, and
   means for deflecting said flexible tube and said gear supported thereon to force the teeth of the flexible gear into engagement with oppositely disposed teeth on said rigid gear at a plurality of separated regions about the periphery of said flexible gear, said means including a permeable magnetic strip wound in layers about the interior surface of said tube, said strip having an end of gradually increasing width disposed adjacent said interior surface of said tube, said means further including electromagnetic field generating means encompassing said tube for coopera- tion with said strip to selectively distort said tube upon selective energization of said field generating means.

2. The gearing system according to claim 1 wherein said strip end of gradually increasing width is angular in shape, being cut at an angle to one edge of the strip from the extreme tip thereof to a point on the opposite edge.

3. The gearing system according to claim 2 wherein the longitudinal distance separating said extreme tip from said point on the opposite edge along the length of said strip is approximately equal to the circumference of said interior surface of said tube.

4. The gearing system according to claim 1 wherein the other end of said strip is also of gradually increasing width and is separated from said interior surface of said tube by at least one layer of said strip.

5. The gearing system according to claim 1 wherein said strip end of gradually increasing width occupies a length of said strip approximately equal to the circumference of said interior surface of said tube.

6. A motion transmitting system comprising:
a rotatable shaft having a longitudinal axis,
a flexible tube capable of elastic deflection coupled to said shaft for rotation therewith and having an axis in common with the longitudinal axis of said shaft,
a normally annular flexible spline on the peripheral surface of said tube and sharing said common axis, said spline having teeth projecting from the outer curved surface thereof,
a rigid circular spline of greater diameter than and encompassing said flexible spline, the teeth of said rigid spline projecting from the inner circular surface thereof for meshing with the teeth of said flexible spline,
means encompassing said tube over at least a portion of the length thereof for generating a rotating magnetic field, and
a magnetically permeable tape residing against the internal surface of said tube in said portion of said length, said tape having an end region of continuously varying width disposed immediately adjacent said internal surface of said tube, said end region occupying a predetermined length of said tape less than the overall tape length,
said tape responsive to the field generated by said field generating means to elastically distort the wall of said tube and thereby force said flexible spline to mesh with said rigid spline along at least one portion of the periphery of said flexible spline.

7. A synchronous actuator comprising
a flexible annular spline adapted for elastic deflection,
a rigid circular spline encompassing said flexible spline for meshing therewith, said rigid spline having a greater diameter than the diameter of said flexible spline such that the splines can mesh only along a portion of the periphery of said flexible spline, said splines having a common axis,
means for generating a rotating magnetic field, and
magnetically permeable strip means having an end region of continuously varying width disposed adjacent the inner curved surface of said flexible spline and wound in a plurality of layers therein for distorting said flexible spline into mesh with said rigid spline under the influence of said magnetic field.

8. The actuator of claim 7 wherein said end region of continuously varying width is cut along a straight line at an angle to one edge of said strip means from the extreme tip thereof to a point on the other edge.

9. The actuator of claim 8 wherein said end region of continuously varying width occupies a length of said strip means approximtaely equal to the circumference of the inner curved surface of said flexible spline.

References Cited
UNITED STATES PATENTS

| | | | |
|---|---|---|---|
| 3,331,974 | 6/1967 | Proctor | 310—83 |
| 3,200,668 | 8/1965 | Janes | 310—83 |

J D MILLER, Primary Examiner

U.S. Cl. X.R.
74—640; 310—49, 83; 318—138